United States Patent [19]

Reynard et al.

[11] 4,332,509
[45] Jun. 1, 1982

[54] RISER PIPE SYSTEM FOR COLLECTING AND RAISING PETROLEUM PRODUCED FROM AN UNDERWATER DEPOSIT

[75] Inventors: Rémi Reynard, Neuilly-sur-Seine; Christian Athe, Le Mee; Jean-Paul Aubert, Puteaux, all of France

[73] Assignee: Coflexip, Rueill Malmaison, France

[21] Appl. No.: 158,261

[22] Filed: Jun. 10, 1980

[30] Foreign Application Priority Data

Jun. 18, 1979 [FR] France .................. 79 15525

[51] Int. Cl.³ .................. E21B 17/01; F16L 11/00
[52] U.S. Cl. .................. 405/168; 138/111; 166/350; 405/195
[58] Field of Search .................. 405/154, 168–171, 405/195, 202–208; 166/367, 359, 350; 175/5–10; 138/111, 112, 113, 114

[56] References Cited

U.S. PATENT DOCUMENTS

| | | | |
|---|---|---|---|
| 3,425,453 | 2/1969 | Fuller | 405/171 X |
| 3,512,581 | 5/1970 | Lawton | 138/111 X |
| 3,517,110 | 6/1970 | Morgan | 166/350 X |
| 3,526,086 | 9/1970 | Morgan | 138/111 X |
| 3,677,302 | 7/1972 | Morgan | 138/111 X |
| 3,685,300 | 8/1972 | Mott et al. | 175/7 X |
| 3,729,756 | 5/1973 | Cook et al. | 166/350 X |
| 3,747,632 | 7/1973 | Kok et al. | 138/111 X |
| 4,149,567 | 4/1979 | Weirich | 138/111 |

*Primary Examiner*—Dennis L. Taylor
*Attorney, Agent, or Firm*—Brisebois & Kruger

[57] ABSTRACT

A piping or conduit system in which conduits to receive flow lines or flexible pipe can be connected end to end to form a riser assembly, and thereafter, the flow lines can be inserted through individual conduits of the assembly. The section contains a low density foam to impart essentially zero negative and positive buoyancy, and the foam is filled into areas surrounding the individual conduits of the sections. Suitable reinforcing and tension stress resisting elements are provided so that each section is essentially self sustaining.

6 Claims, 3 Drawing Figures

RISER PIPE SYSTEM FOR COLLECTING AND RAISING PETROLEUM PRODUCED FROM AN UNDERWATER DEPOSIT

BACKGROUND OF INVENTION

The present invention relates to a riser pipe system for the collection and the raising of petroleum produced from an undersea deposit, and more particularly to such a system of the type composed of a plurality of flexible tubes or flow lines.

Pipe or conduit systems composed essentially of a bundle of flexible tubes or flow line are already known.

These systems always present the disadvantage of providing no protection for the pipes or tubes.

The present invention is intended particularly to alleviate this disadvantage.

SUMMARY OF INVENTION

For this purpose, a unique conduit system according to the invention is characterized by the fact that it is made up of a number of tubular sections joined to each other in a rigid manner, having essentially zero negative and positive buoyancy, and furnished with internal conduits permitting the passage of the flexible pipes, at least one of the internal conduits being a tube provided with sheathing able to sustain the effects of longitudinal traction.

These sections can easily be put in place one against the other at the time of the installation of the system.

Thus it is not until after their assemblage that the flexible pipes or tubes are introduced into the internal conduits and are lowered to be connected to the undersea wells.

In the case where this conduit system goes up to a flotation element, it is not necessary to provide a tensioning system as was formerly the case.

Preferably each section carries at each of its ends a connection piece for rigid attachment end-to-end with the following section, the reinforcing traction sheathing being secured to the two end pieces of the sections, and advantageously the sheathing is bent at its ends around traction elements secured to the end piece of each section.

In one useful embodiment of the invention the internal conduits are made of radially rigid tubes embedded in a synthetic foam of low density.

Other characteristics and advantages of the invention will become apparent in the description of one embodiment which follows.

DETAILED DESCRIPTION OF PREFERRED EMBODIMENT

Figure 1:
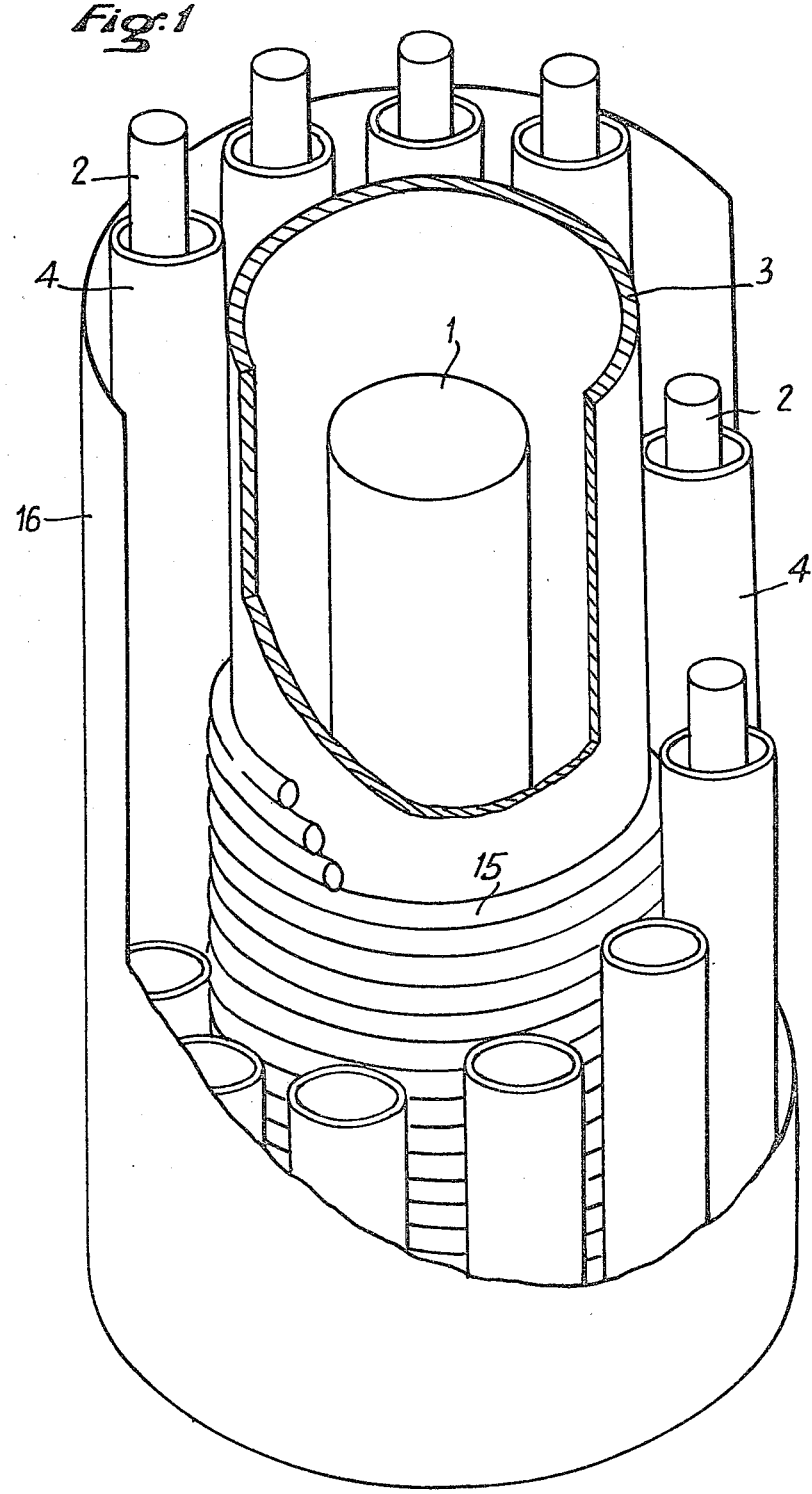
FIG. 1 is a cut-away perspective view of one section of the conduit system according to the invention.

As shown on FIG. 1, the pipe or conduit system according to the invention is made up of a large diameter flexible tube or pipe 1 and a number of flexible tubes or pipes 2 of smaller diameter arranged around flexible pipe 1.

Figure 2:
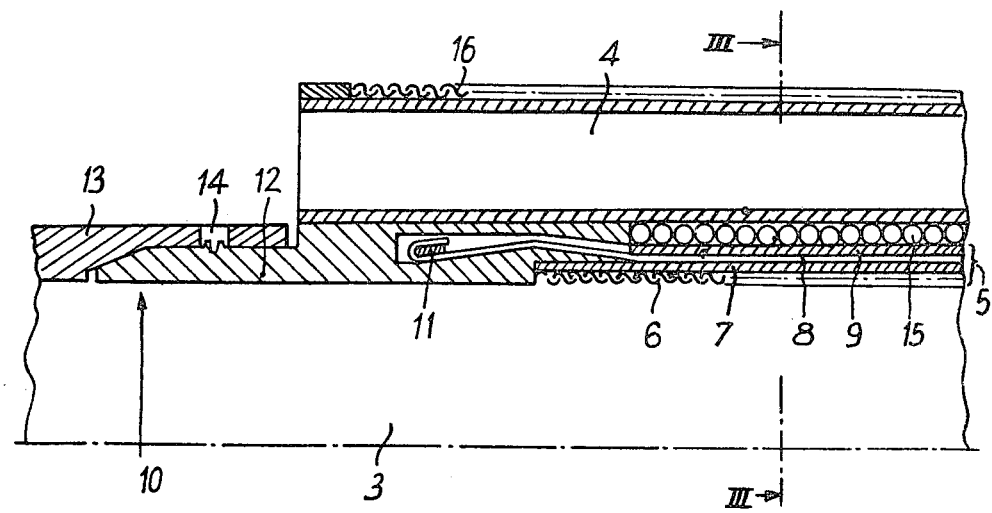
FIG. 2 is a longitudinal cross-section showing the connection between two sections according to the invention.
Figure 3:
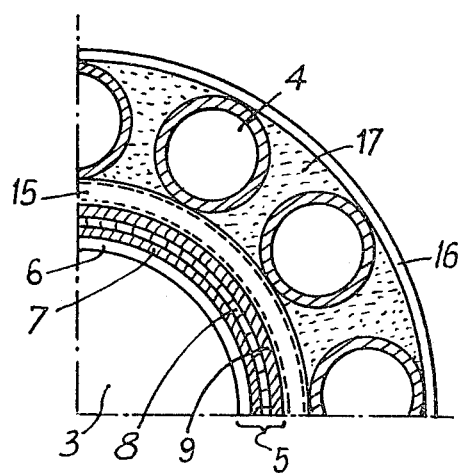
FIG. 3 is a cross-section taken along the line III—III of FIG. 2.

The flexible pipes 1 and 2 are not shown on FIGS. 2 and 3.

Pipe 1 is placed in a radially rigid conduit 3 and the pipes 2 are placed in radially rigid conduits 4, of a riser assembly. FIGS. 2 and 3 show in more detail the structure of wall 5 of conduit 3.

The interior of this wall 5 is formed of a wound interlocked strip forming a tube 6 covered by a first thermoplastic sheath 7.

There is then a reinforced traction sheathing 8 itself covered by a second thermoplastic sheath 9.

Conduits 4 are made of a material such as polyethylene.

Reinforcing sheath 8 of the wall 5 of conduit 3 is joined to the end pieces 10 of each riser section in order to carry or transmit longitudinal traction stresses.

For this effect, the sheathing elements are bent at their ends around a traction element 11 secured to each end piece 10.

Each riser section has at one of its ends a male connector 12 and at its other end a female connector 13.

To assemble the riser the sections are joined end to end in a rigid manner and are attached one to the other by means of fasteners or locking devices 14.

Thus the continuity of each of the internal conduits 3 and 4 is assured.

In order to compensate for the difference in diameter between the conduits 3 and the end pieces 10, a tubular winding 15 is provided such that the exterior diameter of this winding will be equal to the exterior diameter of the end pieces 10.

Thus, conduits 4 can be arranged around the periphery of conduit 3.

Finally, another wound interlocked strip forming a casing 16 is provided around conduits 4 to assure the integrity of the assembly.

In the spaced occuring between the winding 15, the casing 16, and the exterior of conduits 4, is injected a low-density synthetic foam such as polyurethane or expanded polystyrene.

Each section made up of conduit 3, conduits 4, winding 15, casing 16, foam 17, and the end pieces 10, form thus a tubular guiding element permitting the passage of pipes or flow lines 1 and 2.

By providing that these sections have essentially zero positive and negative buoyancy the need for a traction device at their upper end is eliminated.

These sections are made in the following manner.

Conduit 3 is made in a known manner and end pieces 10 are attached to each of the extremities.

The tubular winding 15 is then made, after which conduits 4 are arranged around conduit 3.

Casing 16 is then wrapped around, after which synthetic foam 17 is injected.

The sections thus made can then be taken to their point of use where they are assembled, to form, for example, a riser.

By making the interior diameters of conduits 3 and 4 sufficiently large to permit the passage of flexible pipes 1 and 2, it is thus possible to delay the installation of the pipes until after the column of sections of conduits has been installed.

In particular, it is also possible to replace only one of the pipes 1 and 2 when it has been damaged.

The invention provides as a consequence a conduit system of flexible pipes or flow lines of which the assembly and the maintenance are easy while assuring sufficient protection to the pipes.

Moreover, because of the essentially zero negative buoyancy of the conduit sections, it is not necessary to provide tensioning means for them.

This application is related to application in France No. 79 15525 filed June 18, 1979, and the disclosure thereof is incorporated herein by reference.

What is claimed is:

1. System for the collection and raising of petroleum produced from an underwater deposit, said system being of the type including a plurality of flexible pipes, and comprising a plurality of tubular sections, rigidly connected together and having essentially zero buoyancy, each section having internal conduits of a diameter to allow the passage of the flexible pipes, at least one of the said internal conduits comprising a tube having a reinforcing sheathing able to sustain the effects of longitudinal traction.

2. System according to claim 1, wherein each section has at each of its ends a connection piece for rigid attachment end-to-end with the following section, said traction sheathing being connected to the two end pieces of the section.

3. System according to claim 2, wherein said sheathing is folded at its ends around traction elements each connected to the respective end pieces of the section.

4. System according to any one of claims 1 to 3, wherein said internal conduits comprise radially rigid tubes embedded in a low density synthetic foam.

5. System according to any one of claims 1 to 3, further comprising an encircling casing of a wound interlocked strip.

6. System according to any one of claims 1 to 3, wherein the diameter of each internal conduit is greater than the diameter of the respective flexible pipes.

* * * * *